United States Patent
Walsh et al.

(10) Patent No.: US 7,512,885 B2
(45) Date of Patent: Mar. 31, 2009

(54) GRAPHICAL USER INTERFACE FOR NAVIGATING AND DISPLAYING RELATIONSHIPS AMONG MEDIA DATA AND METADATA

(75) Inventors: Patrick Walsh, Laval (CA); Louis Ayotte, Montreal (CA); Steve McNeill, St. Lazare (CA)

(73) Assignee: Avid Technology, Inc., Tewksbury, MA (US)

( * ) Notice: Subject to any disclaimer, the term of this patent is extended or adjusted under 35 U.S.C. 154(b) by 645 days.

(21) Appl. No.: 10/403,764

(22) Filed: Mar. 31, 2003

(65) Prior Publication Data

US 2004/0189704 A1 Sep. 30, 2004

(51) Int. Cl.
G06F 3/00 (2006.01)
G06F 9/00 (2006.01)
G06F 17/00 (2006.01)

(52) U.S. Cl. .................. 715/723; 715/762; 715/763; 715/853

(58) Field of Classification Search .............. 715/530, 715/723, 853, 854, 762, 763; 345/440, 443
See application file for complete search history.

(56) References Cited

U.S. PATENT DOCUMENTS

| | | | | |
|---|---|---|---|---|
| 5,796,401 | A * | 8/1998 | Winer | 345/619 |
| 6,266,053 | B1 * | 7/2001 | French et al. | 715/500.1 |
| 6,360,223 | B1 * | 3/2002 | Ng et al. | 707/100 |
| 6,408,311 | B1 * | 6/2002 | Baisley et al. | 707/203 |
| 6,477,537 | B2 * | 11/2002 | Gustman | 707/102 |
| 6,636,250 | B1 * | 10/2003 | Gasser | 715/853 |
| 6,654,031 | B1 * | 11/2003 | Ito et al. | 715/723 |
| 6,735,762 | B2 * | 5/2004 | Fujikawa et al. | 717/141 |
| 6,829,615 | B2 * | 12/2004 | Schirmer et al. | 707/102 |
| 7,073,127 | B2 * | 7/2006 | Zhao et al. | 715/719 |
| 2002/0112180 | A1 * | 8/2002 | Land et al. | 713/200 |
| 2003/0131007 | A1 * | 7/2003 | Schirmer et al. | 707/100 |
| 2004/0039934 | A1 * | 2/2004 | Land et al. | 713/200 |
| 2004/0061702 | A1 * | 4/2004 | Kincaid | 345/440 |
| 2004/0085357 | A1 * | 5/2004 | Childress et al. | 345/762 |

\* cited by examiner

*Primary Examiner*—Tadesse Hailu
*Assistant Examiner*—Anita D Chaudhuri
(74) *Attorney, Agent, or Firm*—Peter J. Gordon; Oliver Strimpel

(57) ABSTRACT

An editing system has a graphical user interface that shows media/metadata and metadata/metadata relationships and allows a user to navigate a graph defined by these relationships. Using this graphical user interface, a user may determine, for example, which masterclips are used in a sequence, or which sequences are using those masterclips. Such information can be useful for many purposes. For example, by identifying all masterclips used in a sequence, the media files associated with these masterclips can be readily recaptured in a different format. The graphical user interface provides simple navigation of such relationships by using two panes. Each pane may receive and display indications of any media data or metadata object type defined in the problem domain. In an editing system, such object types may include objects such as projects, sequences, clips and media files. Each of the object types has bidirectional and many-to-many relationships defined with other object types and many relationships can emanate from each object type.

7 Claims, 3 Drawing Sheets

GRAPHICAL USER INTERFACE FOR NAVIGATING AND DISPLAYING RELATIONSHIPS AMONG MEDIA DATA AND METADATA

BACKGROUND

Modern editing systems for editing time-based media such as video and audio are based on the concept of creating relationships between digitized media and metadata describing this media. Furthermore, users can combine the metadata (such as "masterclips" and "sequences") into complex time-based and geometry-based structures. Such metadata also may be collected according to projects. As a consequence, relationships between media and metadata, or among metadata, generally are not one-to-one. For example, a masterclip may refer to multiple pieces of media (e.g., at different digitizing qualities). Similarly, a masterclip may be used by multiple sequences. Such relationships typically define a general graph, which is neither acyclic nor directed. Relationships described by a general graph are hard to describe, visualize and navigate.

To navigate relationships among files and directories in a computer, users generally expect to use a tree structure, as in the Explorer interface in the Windows operating system from Microsoft Corporation. Such a tree structure generally is useful when relationships between objects are exclusively parent-child or container-containee one-to-many relationships with no overlap. These relationships are typically acyclic and directed. Thus, tree structures are useful for files systems in which a folder or file belongs in one and only one folder. A tree structure does not adequately describe the multiple relationships present in a media/metadata environment.

SUMMARY

An editing system has a graphical user interface that shows media/metadata and metadata/metadata relationships and allows a user to navigate a graph defined by these relationships. Using this graphical user interface, a user may determine, for example, which masterclips are used in a sequence, or which sequences are using those masterclips. Such information can be useful for many purposes. For example, by identifying masterclips used in a sequence, the media files associated with these masterclips can be readily recaptured in a different format.

The graphical user interface provides simple navigation of such relationships by using two panes. Each pane may receive and display indications of any media data or metadata object type defined in the problem domain. In an editing system, such object types may include objects such as projects, sequences, clips and media files. Each of the object types has bidirectional and many-to-many relationships defined with other object types and many relationships can emanate from each object type.

Accordingly, in one aspect, a graphical user interface and computer program product is provided for viewing relationships among media objects in an editing system. The media objects are defined using a plurality of classes. Media objects in each class have a bidirectional relationship defined with media objects in other classes. Each media object may have a plurality of relationships with media objects in other classes. The graphical user interface includes a first pane and a second pane associated with the first pane. In response to selection of one or more media objects and a selected relationship, media objects having the selected relationship with the selected one or more media objects are identified. The selected one or more media objects and the identified media objects are displayed in the first and second panes according to the relationship between the media objects.

In another aspect, an editing system is provided for editing sequences of clips of media data. Media data is stored in media files. Media files are referenced by master clips defining a range in the media file. Each clip in a sequence directly or indirectly refers to one or more master clips. Each sequence may be included in one or more projects. The editing system includes a graphical user interface that includes a first pane and a second pane associated with the first pane. A search engine an input for receiving an input set of objects and a relationship direction and an output providing an output set of objects that have the identified relationship with the input set of objects. A display generator has inputs for receiving an indication of the input set of objects, the output set of objects and the relationship direction and has an output for providing display information based on the input set of objects, the output set of objects and the relationship direction for display in the first pane and the second pane.

In another aspect, a graphical user interface is provided for viewing relationships among objects. The objects are defined in a plurality of types. Objects of each type may have a bidirectional relationship with objects of another type. Each object may have a plurality of relationships with objects of the other type. The graphical user interface includes a first pane and a second pane associated with the first pane. In response to selection of one or more objects and a selected relationship, objects having the selected relationship with the selected one or more objects are identified. The selected one or more objects and the identified objects are displayed in the first and second panes according to the relationship between the objects.

DETAILED DESCRIPTION

Figure 1:
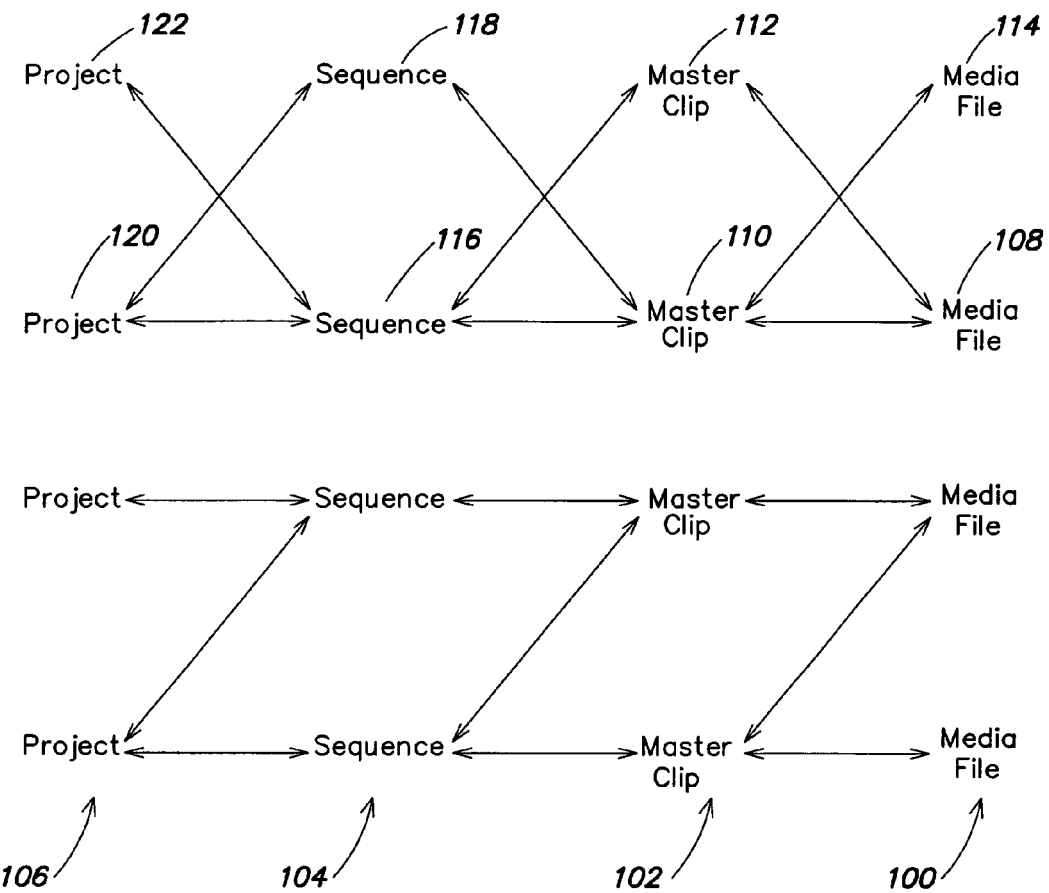
FIG. 1 is diagram illustrating bidirectional and many-to-many relationships among a set of example object types.

Referring now to FIG. 1, an example of kinds of object types and relationships among them will now be described. This example is derived from a video editing system in which media files 100 are referenced by masterclips 102, which in turn are combined into sequences 104. Sequences may be collected into projects 106. Media files include media data. The other object types include metadata. A media file, e.g., 108 may be referenced by more than one masterclip, e.g., 110 and 112. A masterclip, e.g., 110, may reference more than one media file, e.g., 108 and 114. Similarly, a masterclip, e.g., 110, may be referenced by more than one sequence, e.g., 116 and 118. A sequence, e.g., 116, may reference more than one masterclip, e.g. 110 and 112. Similarly, a sequence, e.g., 116, may be referenced by more than one project, e.g., 120 and 122. A project, e.g., 120, may reference more than one sequence, e.g., 116 and 118. Relationships from the left to right in this diagram, or towards media data, are called "forward relationships" herein. Relationship from right to left in this diagram, or away from media data, are called "backward relationships" herein. A "forward relationship" from a first object to a second object can be understood as one where the first object uses the second object. A "backward relationship"

from a first object to a second object can be understood as one where the first object is used by the second object.

The relationships among these objects may be represented by double maps. A first map maps each object of a first type to objects of a second type that it references. A second map maps each object of the second type to objects of the first type that it references. A double map is used for each relationship that may exist between pairs of types of objects. These maps may be created by indexing objects, such as projects, sequences and masterclips, to locate the relationships defined by those objects. The maps may be queried using one or more keys identifying objects, and the map returns a set of the objects related to the identified objects in the map.

Figure 2:
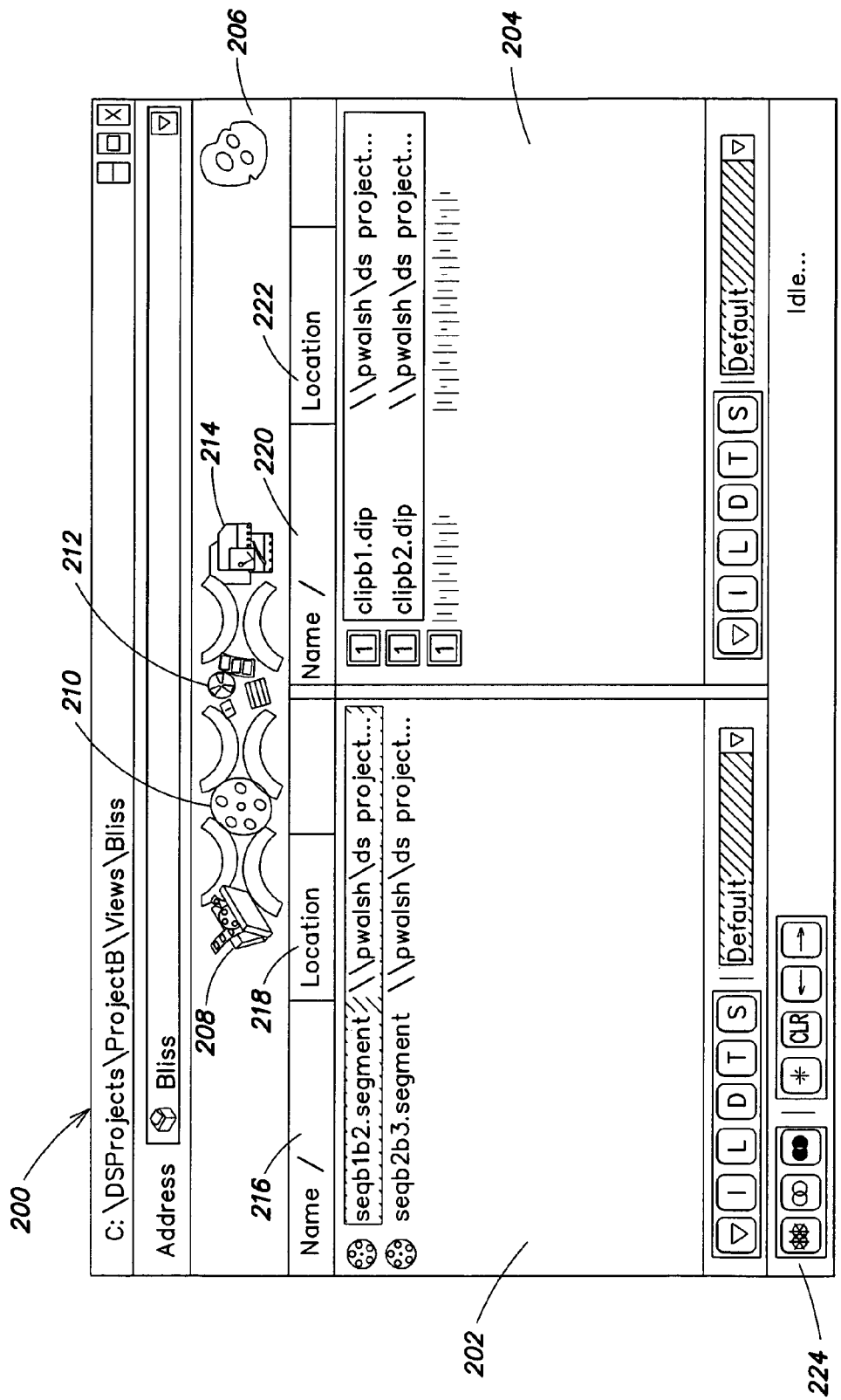
FIG. 2 is a diagram of an example display for a graphical user interface for navigating relationships such as in FIG. 1.

Referring now to FIG. 2, an example display for a graphical user interface for navigating such relationships will now be described. The display includes a window 200 that includes a first pane 202 and a second pane 204 associated with the first pane. The second pane is shown horizontally adjacent to the first pane. The invention, however, is not limited to a specific relative orientation of these two panes in the display.

In the general operation of the user interface, in response to selection of one or more media objects (for example, by placing it in the first pane 202), media objects having a selected relationship to the selected media objects are identified. The selected media objects and identified media objects are displayed in the first and second panes 204. There is a forward relationship from the objects displayed in the first pane to the objects displayed in the second pane. For example, if objects are placed in the first pane 202 then the forward relationship is traversed to identify objects, which are then placed in the second pane 204. If objects are placed in the second pane 204, the backward relationship is traversed to identify objects, which are then placed in the first pane 202.

If a media object is displayed in a pane, information about the media object, for example, but not limited to, an identifier such as a name 216, 220 and location 218, 222 may be displayed in one or more columns. These columns may be designed to permit sorting of the viewed elements in the same manner as found in file systems, such as the Explorer interface in the Windows operating system.

The window 200 also includes a header 206 that displays icons 208, 210, 212 and 214, corresponding, respectively, to projects, sequences, masterclips and media. The icons permit a user to select the kind of relationships to be analyzed and displayed by the graphical user interface. For example, a user may drag and drop an object, e.g., a sequence, from a pane onto an icon, e.g., the media icon 214, which causes an identifier of the sequence to be displayed in the first pane and identifiers of the associated media to be displayed in the second pane. The relationships between objects in the first and second pane need not be adjacent. For example, projects could be selected from the first pane and dropped on the media icon to instruct the user interface to identify and display all of the media data used by the selected projects.

The icons in the header also may be dragged to one of the panes. For example, by dragging the project icon to a pane, the targeted pane is filled with all projects defined in a project root. By dragging the sequences icon to a pane, the targeted pane is filled with all sequences in current project. By dragging the masterclip icon to a pane, the targeted pane is filled with all masterclips in current project. By dragging the media files icon to a pane, the targeted pane is filled with all media files in the current project.

Media objects generally also are stored in the file system. By navigating the file system using a conventional tool, such as the Explorer interface in the Windows operating system, media objects can be identified and selected. These selected objects also can be dragged to one of the panes in the display to initiate display of the related objects.

The window 200 also may include a toolbar 224 that includes icons for initiating various operations. An example operation is a set operation on the result that has been computed, such as a union, intersection, complement of intersection operation. Another operation is selecting whether cache files are included in searches for media files. Another operation is clearing both of the panes in the display. A variety of such operations could be provided and the invention is not limited to providing any particular operations.

A history also may be kept and icons may be used to permit navigation backward and forward in the analysis history. The history may be stored as an array of the sets returned from queries on the maps of objects.

Objects that are displayed in one of the panes also may be selected and used for other purposes as if they were selected using a file system. For example, in an editing system, the objects may be placed on a timeline or in an effects tree or otherwise made part of a composition. The objects displayed in the user interface may be represented using "shortcut" technology from the Windows operation system.

Figure 3:
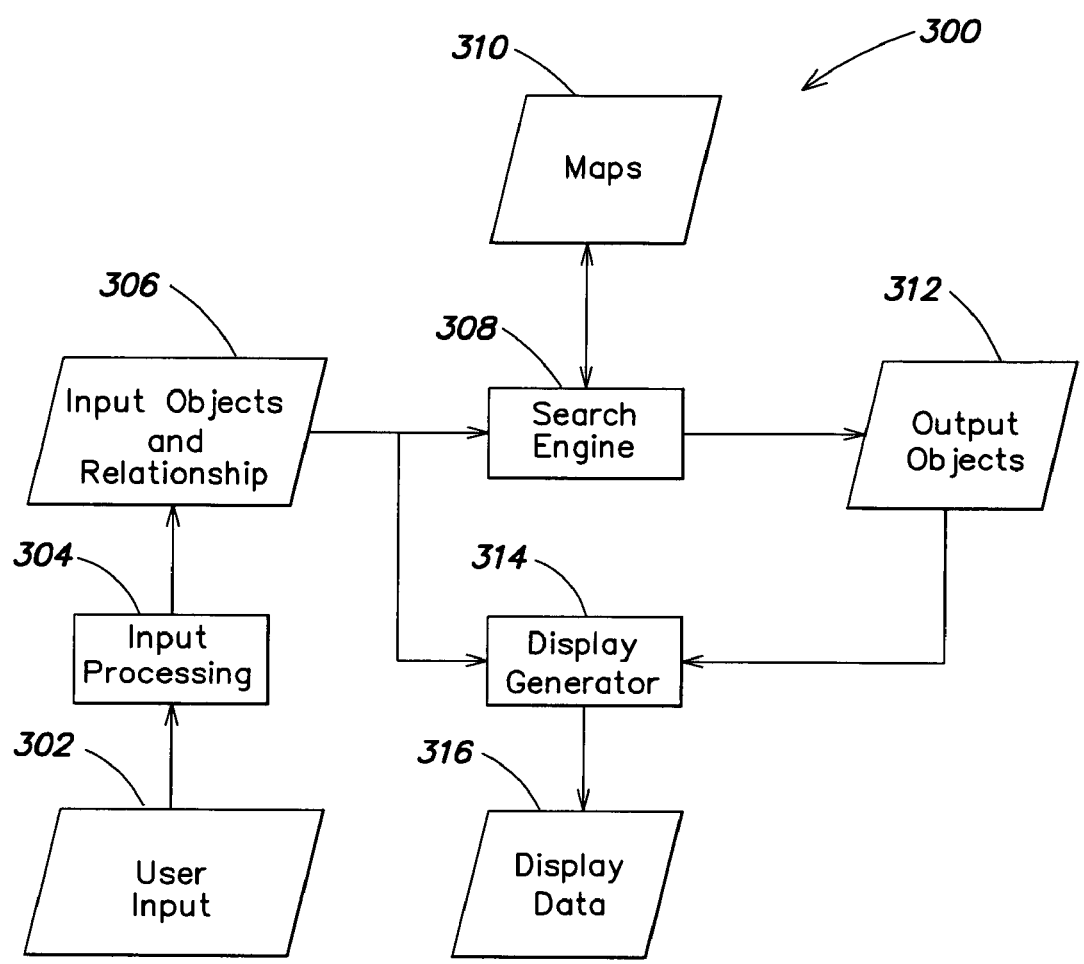
FIG. 3 is a data flow diagram of an example system for generating the display of FIG. 2.

Referring now to FIG. 3, a data flow diagram of an example system 300 for generating the display of FIG. 2 will now be described. In this system, user input 302 is processed by an input processing module 304. The input processing module in general processing input signals from an input device (not shown) in a manner that allows the user to select objects that are displayed on a display (not shown). In particular, the input processing module provides as an output an indication 306 of the input objects and a relationship with those input objects. The indication of the input objects and the relationship are provided to a search engine 308. This search engine accesses maps 310 that are information representing the media objects and their interrelationships. For each element in the list of input objects, it identifies the media objects having the designated relationship. The results for each input object may be stored to permit individual selection at a later time. The combined list of objects identified through the search are provided as output objects 312. The output objects 312 and the input objects 306 are provided to a display generator 314 that generates the display data 316 that is displayed in each pane of the graphical user interface.

Some example ways in which this graphical user interface may be used are the following.

EXAMPLE 1

Simple Navigation

A user may drop a project in the left pane. The right pane then is filled with sequences belonging to the project. The user may then select and drag one or more sequences from the right pane onto the left pane. The left pane then includes those sequences. The right pane then is filled with clips used by these sequences. The user may select and drag some clips from the right pane onto the left pane. The left pane then includes those clips. The right pane then is filled by media files referenced by clips in left pane. A user also could select an item in a pane. The related item in the other pane then is highlighted. The user also may select one or more media files in the right pane and drop those same media files in the right pane. The left pane then is filled with clips that use these media files. Similarly, the user may select one or more clips in the left pane and drop them onto the right pane. The left pane then is filled with sequences that use these clips.

EXAMPLE 2

Locating a Sequence

A user may want to know which sequence uses a specific media file. The user may drop the media file in the right pane. The left pane then is filled with clips that use that media file. The user then may select the clips in the left pane and drop them onto the right pane. The left pane then is filled to include sequences that include those clips, and thus include the selected media file.

EXAMPLE 3

Purging Media Files

A user also may want to purge media files in a specified resolution that are used by a project. This operation typically is performed to permit recapture of the media files at a higher resolution. The user drops a project in the left pane. The right pane then is filled by the sequences used by project. The user then selects all the sequences from the right pane and drops them in the left pane. The right pane then is filled with all clips used by the dropped sequences. The user then selects all the clips in the right pane and drops them in the left pane. The right pane then is filled with all the media files used by these clips. The user then selects the media files at the desired resolution. A contextual menu then may be presented, which permits the user to select a delete operation to delete the selected media files.

The invention is not limited in application to time-based media such as video and audio. The invention may be used to navigate any data relationships where there is a set of object types that have relationships among them that define a general graph. For example, but not limited to this example, this invention could be used to visualize and navigate information in a database.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, such as "C++," Visual Basic, JAVA or other language, such as a scripting language or even assembly language. The computer system may also be specially programmed, special purpose hardware. In a general-purpose computer system, the processor is typically a commercially available processor, such as various processors available from Intel, AMD, Cyrix, Motorola, and IBM. The general-purpose computer also typically has an operating system, which controls the execution of other computer programs and provides scheduling, debugging, input/output control, accounting, compilation, storage assignment, data management and memory management, and communication control and related services. Example operating systems include, but are not limited to, the UNIX operating system and those available from Microsoft and Apple Computer.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 3 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A graphical user interface for viewing relationships among media objects in an editing system, wherein the media objects are defined using a plurality of classes, and wherein media objects in each class have a bidirectional relationship defined with media objects in other classes, and the graphical user interface comprising:

a first pane;

a second pane associated with the first pane;

means for receiving an indication of a selection by the user of a selected use relationship comprising a relationship selected from the group consisting of a forward and a backward relationship;

means for receiving an indication of a selection by the user of one or more media objects;

means, operative in response to the user selected one or more media objects and the selected use relationship, for identifying media objects having the selected use relationship with the selected one or more media objects; and means for displaying the selected one or more media object in one of the first and the second panes and the identified media objects in the other one of the first and the second panes according to the use relationship between the media objects.

2. The graphical user interface of claim 1, wherein the means for identifying comprises:

means, operative in response to placement of an identifier of a selected media object in the first pane, for identifying media objects having a forward relationship to the selected media object, and for displaying an identifier for the identified media objects in the second pane; and means, operative in response to placement of an identifier of a selected media object in the second pane, for identifying media objects having a backward relationship to the selected media object, and for displaying an identifier for the identified media objects in the first pane.

3. The graphical user interface of claim 1, wherein the media objects include projects, sequences, master clips and media files.

4. A computer program product comprising:

a computer readable medium;

computer program instructions stored on the computer readable medium that, when executed by a computer, instruct the computer to provide a graphical user interface for viewing relationships among media objects in an editing system, wherein the media objects are defined using a plurality of classes, and wherein media objects in each class have a bidirectional relationship defined with media objects in other classes, and wherein each media object may have a plurality of relationships with media objects in other classes, the graphical user interface comprising:

a first pane;

a second pane associated with the first pane;

means for receiving an indication of a selection by the user of a selected use relationship the use relationship comprising a relationship selected from the group consisting of a forward relationship and a backward relationship;

means for receiving an indication of a selection by the user of one or more media objects;

means, operative in response to the user selected one or more media objects and the user selected use relationship, for identifying media objects having the selected use relationship with the selected one or more media objects; and means for displaying the selected one or more media objects in one of the first and the second panes pane and the identified media objects in the other one of the first and the second panes pane according to the use relationship between the media objects.

5. The computer program product of claim 4, wherein the means for identifying comprises:

means, operative in response to placement of an identifier of a selected media object in the first pane, for identifying media objects having a forward relationship to the selected media object, and for displaying an identifier for the identified media objects in the second pane; and means, operative in response to placement of an identifier of a selected media object in the second pane, for identifying media objects having a backward relationship to the selected media object, and for displaying an identifier for the identified media objects in the first pane.

6. An editing system for editing sequences of clips of media data, wherein media data is stored in media files and wherein media files are referenced by master clips defining a range in the media file, and wherein each clip in the sequence directly or indirectly refers to one or more master clips, and wherein each sequence may be included in one or more projects, the editing system comprising:

a graphical user interface that includes a first pane and a second pane associated with the first pane;

a search engine having an input for receiving an input set of media objects and a relationship direction and an output providing an output set of media objects that have the identified relationship with the input set of media objects; and a display generator having inputs for receiving an indication of the input set of media objects, the output set of media objects and the relationship direction and having an output for providing display information based on the input set of media objects, the output set of media objects and the relationship wherein display information for the input set of media objects is direction for display in the first pane and wherein display information for the output set of media objects is for display in the second pane; and an input processing module having an input for receiving user input indicative of the input set of media objects and the relationship direction.

7. The editing system of claim 6, wherein the relationship direction is indicated by whether the input set of objects is in the first pane or the second pane.

* * * * *